United States Patent
Yamamoto et al.

(10) Patent No.: US 6,860,154 B2
(45) Date of Patent: Mar. 1, 2005

(54) PRESSURE SENSOR AND MANUFACTURING METHOD THEREOF

(75) Inventors: Satoshi Yamamoto, Sakura (JP); Osamu Nakao, Sakura (JP); Hitoshi Nishimura, Sakura (JP); Masahiro Sato, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/047,627

(22) Filed: Jan. 14, 2002

(65) Prior Publication Data

US 2002/0092356 A1 Jul. 18, 2002

(30) Foreign Application Priority Data

Jan. 16, 2001 (JP) ................................ P2001-007756
Feb. 7, 2001 (JP) ................................ P2001-030783

(51) Int. Cl.$^7$ .......................... G01L 9/12; G01L 7/08; G01L 9/00; G01L 9/16
(52) U.S. Cl. ........................... 73/718; 73/715; 73/724; 73/754; 73/361; 73/283.4; 73/216; 73/2; 73/438; 73/53; 73/504
(58) Field of Search ............... 73/715, 718, 724–727, 73/862.043, 754, 862; 361/503, 523, 283.1–283.4; 438/53, 504; 216/2; 29/621; 156/357, 662

(56) References Cited

U.S. PATENT DOCUMENTS

| | | | |
|---|---|---|---|
| 3,993,939 A | 11/1976 | Slavin et al. | |
| 4,092,696 A | 5/1978 | Boesen et al. | |
| 4,203,128 A | 5/1980 | Guckel et al. | |
| 4,332,000 A | 5/1982 | Petersen | |
| 4,823,230 A | 4/1989 | Tiemann | |
| 4,831,492 A | 5/1989 | Kuisma | |
| 4,838,088 A | 6/1989 | Murakami | |
| 4,993,143 A * | 2/1991 | Sidner et al. ................. | 438/53 |
| 5,186,054 A | 2/1993 | Sekimura | |
| 5,241,864 A | 9/1993 | Addie et al. | |
| 5,332,469 A * | 7/1994 | Mastrangelo ............... | 156/643 |
| 5,349,873 A * | 9/1994 | Omura et al. ........... | 73/862.68 |
| 5,528,452 A | 6/1996 | Ko | |
| 5,585,311 A | 12/1996 | Ko | |
| 5,591,679 A | 1/1997 | Jakobsen et al. | |
| 5,706,565 A | 1/1998 | Sparks et al. | |
| 5,741,606 A * | 4/1998 | Mayer et al. ................. | 429/53 |
| 5,844,287 A * | 12/1998 | Hassan et al. .............. | 257/419 |
| 5,929,497 A | 7/1999 | Chavan et al. | |
| 5,936,164 A | 8/1999 | Sparks et al. | |
| 6,020,272 A * | 2/2000 | Fleming ..................... | 438/734 |
| 6,097,821 A * | 8/2000 | Yokoyama et al. ......... | 381/191 |
| 6,109,113 A | 8/2000 | Chavan et al. | |
| 6,378,381 B1 * | 4/2002 | Okada et al. .......... | 73/862.043 |
| 2002/0014126 A1 * | 2/2002 | Okada .................. | 73/862.043 |

FOREIGN PATENT DOCUMENTS

| | | | |
|---|---|---|---|
| DE | 100 05 536 A1 | 8/2000 | |
| EP | 0 727 650 A2 | 8/1996 | |
| JP | 10-509241 | 9/1998 | |
| JP | 11-326095 | 11/1999 | |
| JP | 2000-91663 | * 3/2000 | ........... H01L/41/22 |
| JP | 2000-234977 | * 8/2000 | ............. G01L/9/12 |

OTHER PUBLICATIONS

Seidel, H., et al., "Anisotropic Etching of Crystalline Silicon in Alkaline Solutions," J. Electrochem, Soc., vol. 137, No. 11, Nov. 1990, pp. 3626–3632.

* cited by examiner

Primary Examiner—Andrew H. Hirshfeld
Assistant Examiner—Marissa Ferguson
(74) Attorney, Agent, or Firm—Bell, Boyd & Lloyd LLC

(57) ABSTRACT

It is an object of the present invention to provide a touch mode capacitive pressure sensor having higher pressure durability than conventional sensors. In this invention, a touch mode capacitive pressure sensor has a diaphragm made from boron-doped silicon, and the boron concentration at the top face of the diaphragm is equal to or greater than $1 \times 10^{19}$ cm$^{-3}$ and less than $9 \times 10^{19}$ cm$^{-3}$. Further, in this invention, a touch mode capacitive pressure sensor has a conductive diaphragm made by doping of an impurity and anisotropic etching, and the etch pit density on the top face of the diaphragm is equal to or less than five per $\mu$m$^2$, and preferably equal to or less than one per $\mu$m$^2$. As a result, the pressure durability of the diaphragm is greatly improved.

6 Claims, 3 Drawing Sheets

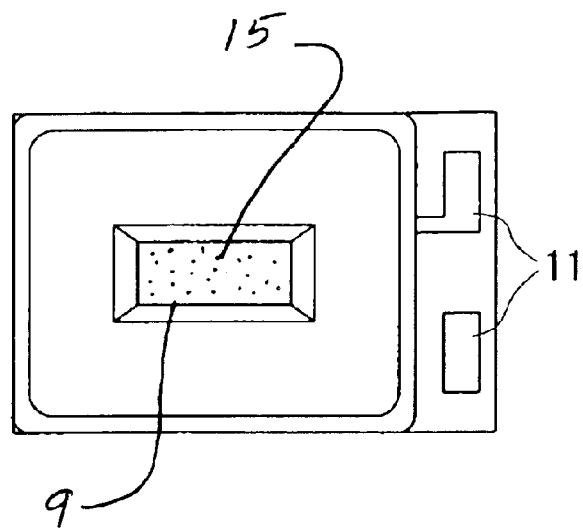
FIG. 1A
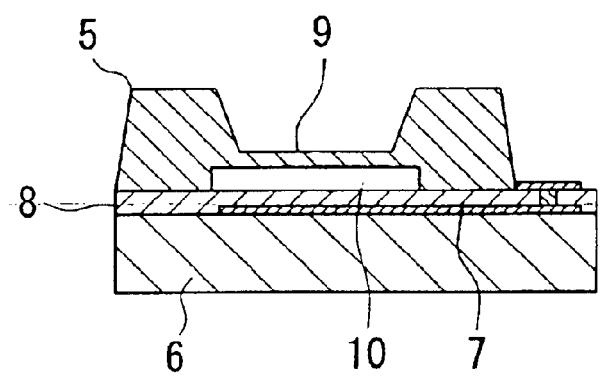
FIG. 1B
FIG. 2
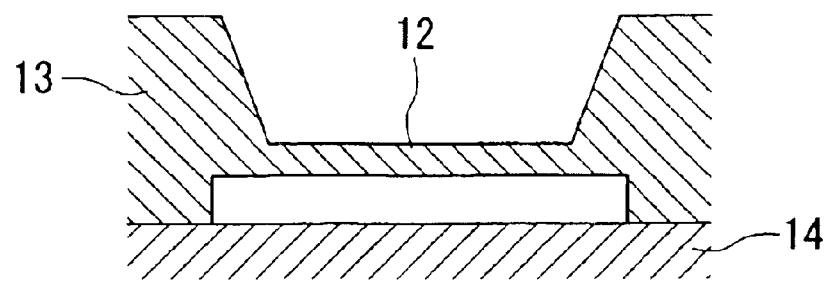

PRESSURE SENSOR AND MANUFACTURING METHOD THEREOF

BACKGROUND OF THE INVENTION

1. Field of the Invention

The present invention relates to a touch mode capacitive pressure sensor, and more particularly relates to the structure of a pressure sensor having high durability to pressure and a method for manufacturing the pressure sensor.

2. Description of the Related Art

A capacitive pressure sensor has a substrate on which is provided a diaphragm, which changes its shape in accordance with pressure, and a substrate which an electrode is provided on; these substrates are bonded together so as to face each other with a gap therebetween. Pressure is detected based on change in the capacitance between the diaphragm and the electrode. Wafers of silicon or glass can be used as the substrates where the diaphragm and the electrode are provided, enabling a large number of sensors to be formed on a wafer simultaneously, which is advantageous for inexpensive mass production.

FIG. 5A shows one example of such a capacitive pressure sensor, which is a touch mode capacitive pressure sensor disclosed in U.S. Pat. No. 5,528,452. As shown in FIG. 5A, an electrode 1 comprises a metal thin-film and is provided on a glass substrate, and a dielectric film 2 is provided on the electrode 1. A diaphragm having at least a conductive surface is provided above and facing the dielectric film 2 with a slight gap 4 therebetween. As shown in FIG. 5B, when pressure is applied, the diaphragm 3 bends and touches the dielectric film 2 (this is termed "touch mode").

The diaphragm 3 has a P+ layer which is made by high concentration doping of boron in n-type silicon, and, when the diaphragm 3 is regarded as one electrode, when detecting pressure, the electrode 1, the dielectric film 2, and the diaphragm 3 form a capacitor. Change in the area of the contact between the diaphragm 3 and the dielectric film 2 is detected as change in the capacitance between two electrodes (between the diaphragm 3 and the electrode 1), making it possible to measure the pressure on the diaphragm 3. The touch mode capacitive pressure sensor is more sensitive and has higher durability against overload pressure than other capacitive pressure sensors, and has many other superior characteristics, such as a linear output change of capacitance against applied pressure.

FIG. 6 shows the relationship between applied pressure and capacitance of the touch mode capacitive pressure sensor. Due to the characteristics of the touch mode capacitive pressure sensor, in the low pressure region (non-contact region) the output capacitance of the sensor does not change at all before the diaphragm touches the dielectric film. After the diaphragm touches the dielectric film, the capacitance of the sensor increases linearly (linear region) within a certain range with respect to pressure, and, when pressure increases more, sensitivity gradually decreases and change in the capacitance is saturated (saturation region).

A diaphragm using a single-crystal silicon is often formed by anisotropic etching, which utilizes differences in the etching rate due to the crystal orientation of the silicon, using an inorganic solution such as KOH, NaOH, or an organic solution such as ethlyene diamine pyrocatechol (EDP) and tetramethyl ammonium hydroxide (TMAH). Of the solutions for etching mentioned above, the KOH water solution is widely used in anisotropic etching of single-crystal silicon because it is inexpensive and has a higher etching rate than other solutions for etching.

In general, "etch stop technique" are used to form a thin diaphragm which has a few micron meters thickness only. One of the technique applies the effect that the etching rate in a highly doped P+ layer, for instance where boron concentration exceeds $10^{19}$ cm$^{-3}$, is one tenth or one hundredth lower than that in a normal doped layer in silicon. By controlling the thickness of the diaphragm and the distance of the gap between the two electrodes, the linear region can be adjusted to match the required operating range of the sensor. For example, in the sensor for detecting tire pressure, the center of the operating range should be adjusted to approximately 10 kgf/cm$^2$.

As described above, the conventional touch mode capacitive pressure sensor characteristically has high sensitivity and high durability against overload pressure, and can be made to operate stably within a required pressure range by changing the thickness of the diaphragm and the distance of the gap between the two electrodes.

However, some of applications require the sensor to withstand high pressure which greatly exceed the actual operating pressure range, e.g. four or five times higher than the upper limit of the measurable pressure range. Those diaphragm of the sensor may destroyed in such high pressure. The diaphragm breaks at the edge where most of the stress is produced when it bends and touches the dielectric film.

SUMMARY OF THE INVENTION

It is an object of the present invention to provide a touch mode capacitive pressure sensor which has higher durability against overload pressure than conventional sensors have.

The present inventors conducted research in order to achieve the above object, and discovered that the durability of the diaphragm can be significantly improved by controlling the boron concentration at the top face of the diaphragm, with the result that the diaphragm does not break even when the applied pressure greatly exceeds the actual operating pressure range, thereby making the pressure sensor suitable for applications to detect the pressure of vehicle tires, which demand high durability.

The present invention is characterized in that a pressure sensor comprises a silicon structure having a conductive diaphragm, the silicon structure being bonded on a substrate, which comprises an electrode covered by a dielectric film, so that the diaphragm and the electrode are facing each other and there is a gap between the diaphragm and the dielectric film. The pressure sensor measures applied pressure by detecting capacitance according to touching area of the diaphragm on the dielectric film. The optimal concentration of impurity at the top face of the diaphragm for its high durability is equal to or greater than $1 \times 10^{19}$ cm$^{-3}$ and less than $9 \times 10^{19}$ cm$^{-3}$.

The present invention provides a manufacturing method of the pressure sensor of which durability against overload pressure is improved, comprising a silicon structure having a conductive diaphragm, the silicon structure being bonded on a substrate, which comprises an electrode covered by a dielectric film, so that the diaphragm and the electrode are facing each other and there is a gap between the diaphragm and the dielectric film, the pressure sensor measures applied pressure by detecting capacitance according to touching area of the diaphragm on the dielectric film. The method comprises a step of manufacturing the silicon structure by doping a high concentration impurity from the side of silicon being bonded to the substrate, and providing the diaphragm by etching so that the concentration of the impurity at the top face is equal to or greater than $1 \times 10^{19}$ cm$^{-3}$ and less than $9 \times 10^{19}$ cm$^{-3}$.

Preferably, in the pressure sensor manufacturing method, at least one solution is selected from a group comprising KOH, NaOH, ethyene diamine pyrocatechol (EDP), and tetramethyl ammonium hydroxide (TMAH), and is used as the solution for etching.

Furthermore, the present inventors have used observation by atomic force microscopy (AFM) to discover the fact that there are a great number of micro-etch pits in the top face of the diaphragm manufactured by the conventional etch stop method. These pits are generated in etching of regions of the boron-doped layer where the boron concentration exceeds $9 \times 10^{19}$ cm$^{-3}$, and it was confirmed that the number of the etch pits increases in correspondence with a length in the etching time. Moreover, the present inventors completed the present invention after investigating the relationship between etch pits and pressure durability, and discovered that the pressure durability of the diaphragm dramatically improves when the etch pit density is equal to or less than five pits per $\mu$m$^2$, particularly one pit per $\mu$m$^2$.

The pressure sensor of this invention comprises a silicon structure having a conductive diaphragm, provided by doping of an impurity and anisotropic etching, the silicon structure being bonded on a substrate, which comprises an electrode covered by a dielectric film, so that the diaphragm and the electrode are facing each other and there is a gap between the diaphragm and the dielectric film. The pressure sensor measures applied pressure by detecting capacitance according to touching area of the diaphragm on the dielectric film. The etch pit density on the top face of the diaphragm is equal to or less than five per $\mu$m$^2$.

Furthermore, the invention provides a manufacturing method for a pressure sensor comprising a silicon structure having a conductive diaphragm, provided by doping of an impurity and anisotropic etching, the silicon structure being bonded on a substrate, which comprises an electrode and a dielectric film covering the electrode, so that the diaphragm and the electrode are facing each other and there is a gap between the diaphragm and the dielectric film, the pressure sensor measures applied pressure by detecting capacitance according to touching area of the diaphragm on the dielectric film. The method comprises a step of manufacturing the silicon structure by doping the top face of the silicon with an impurity at high concentration, and etching the diaphragm so that the etch pit density on the top face of the diaphragm is equal to or less than five per $\mu$m$^2$.

Preferably, in the pressure sensor manufacturing method, the etching is performed using a KOH solution having concentration equal to or greater than 1 weight % and less than 10 weight %, and the etch pit density on the top etching face is equal to or less than one per $\mu$m$^2$.

BRIEF DESCRIPTION OF THE DRAWINGS

FIG. 1A is the top view of a pressure sensor, showing one example of the pressure sensor of the present invention.

FIG. 1B is the cross-sectional view of a pressure sensor, showing one example of the pressure sensor of the present invention.

FIG. 2 is the enlarged cross-sectional view of primary parts of the pressure sensor shown in FIGS. 1A and 1B.

DESCRIPTION OF THE PREFERRED EMBODIMENTS

Figure 3:
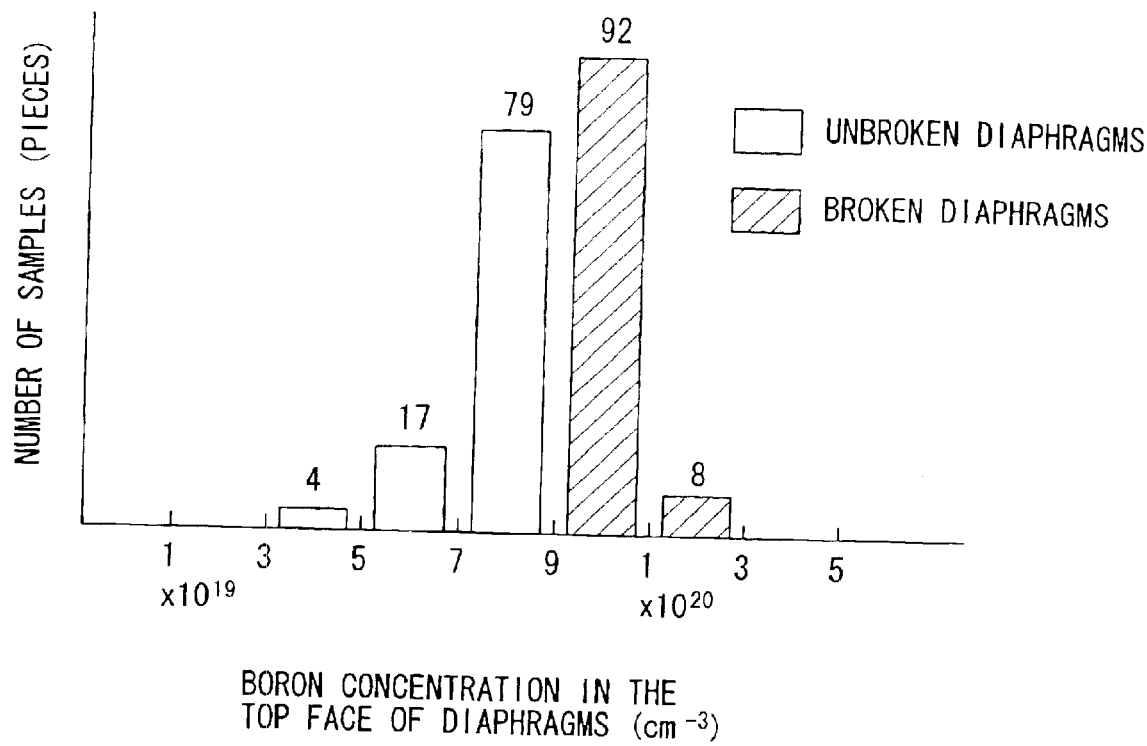
FIG. 3 is a graph showing the relationship between boron concentration at the top face of diaphragms and the number of broken or unbroken diaphragm.

Embodiments of the present invention will be explained with reference to the drawings. FIG. 1A is the top view of one example of the pressure sensor of the present invention, and FIG. 1B is the cross-sectional view of one example of the pressure sensor. FIG. 2 is the enlarged cross-sectional view of primary parts of the pressure sensor shown in FIGS. 1A and 1B.

Embodiment 1

The pressure sensor comprises a silicon structure 5 comprising a conductive diaphragm 9, which can deform its shape in accordance with applied pressure, and the silicon structure 5 is provided on a substrate 6 having a dielectric film 8 which covers an electrode 7 comprising a metal thin film. The diaphragm 9 faces the electrode 7 and there is a gap 10 between the diaphragm 9 and the dielectric film 8.

The diaphragm 9 is provided in the silicon structure 5 by etching a silicon wafer. The diaphragm 9 can be formed in the silicon wafer of which surface layer is doped with an impurity such as boron at high concentration and the high doped layer work as an etch stop one. In this invention, the impurity concentration in the surface of the diaphragm 9 is equal to or greater than $1 \times 10^{19}$ cm$^{-3}$ and less than $9 \times 10^{19}$ cm$^{-3}$. The thickness of the diaphragm 9 and the depth of the indentation in the bottom side of the diaphragm, which determines the distance of the gap 10 between the diaphragm 9 and the dielectric film 8, can be set as appropriate so that the linear region of the sensor matches the operating pressure range of the apparatus being measured.

There are no particular restrictions covering the material for the substrate 6, the only requirement being that it is a material capable of ensuring electrical insulation from the electrode 7. For example, it is possible to use a glass plate, a ceramic plate, a hard plastic plate, a silicon wafer with an oxide film surface, and the like, but the glass plate is most preferable. The electrode 7 is provided on the substrate 6 by forming a film of a metal of various types which are generally used as material for electrodes, such as Aluminum, Chromium, Gold, Silver, Copper, Titanium, by using a thin-film formation method such as deposition, sputtering, CVD, and nonelectrolytic plating, on the surface of the substrate 6. The shape of the electrode 7 can be patterned as required by covering the portion of the surface of the substrate 6 where the electrode film is not provided with a mask, and forming the metal film only on the electrode portion; alternatively, the metal film is provided over the entire surface of the substrate 6, and then etched to the required shape by using photolithography; other methods may be used instead.

The dielectric film 8 is provided on the substrate 6 so as to cover the electrode 7 by forming a thin film of a material which is conventionally used as insulating material, such as glass (quartz glass) and ceramic, using a method such as sputtering and CVD. The thickness of the dielectric film 8 is set as appropriate in accordance with the sensitivity required by the pressure sensor, and is usually approximately 0.1 to several μm.

The terminal pads 11, one of which is connected to the electrode 7 and extends as far as the edge of the substrate 6 and the other is provided on the dielectric film 8 and is electrically connected to the silicon structure 5, are provided on the substrate 6. These terminal pads 11 can be formed by using the same metal as the electrode 7 and the same method for forming thin-film.

The gap 10 between the diaphragm 9 and the dielectric film 8 of the substrate 6 is provided by indenting the bottom face of the silicon structure 5 to a rectangular shape which is slightly larger than the electrode 7 and the diaphragm 9. The distance of the gap 10 (i.e. the distance between the dielectric film 8 and the diaphragm 9) is selected as appropriate in accordance with the dimensions (length, width, and thickness) of the diaphragm 9. In this embodiment, the inside of the gap 10 is a vacuum.

Subsequently, a method for manufacturing the pressure sensor having the structure described above will be explained as one example of the pressure sensor manufacturing method of the present invention.

To manufacture the substrate 6, the electrode 7 and the terminal pads 11 connected thereto are provided on the substrate 6 by using sputtering and the like as mentioned above; then, the glass dielectric film 8 is formed by sputtering and the like, covering the electrode 7 while leaving the terminal pads 11 exposed, and one of the terminal pads 11 on the silicon structure 5 side is provided by using the same method as the electrode 7.

The silicon structure 5 is manufactured by high concentration doping of an impurity, such as boron, from the face of the silicon wafer by using a method such as thermal diffusion. The doped-side (face) bonds to the substrate 6, and then providing the diaphragm 9 by etching from the reverse side of the bonded side so that the impurity concentration at the top face (etching face) is equal to or greater than $1\times10^{19}$ cm$^{-3}$ and less than $9\times10^{19}$ cm$^{-3}$. This etching process is performed by using at least one solution selected from a group comprising KOH, NaOH, ethylene diamine pyrocatechol (EDP), and tetramethyl ammonium hydroxide (TMAH), and by utilizing the "etch stop technique" for remaining the section which has been doped with a high concentration impurity; and the etching time is controlled so that the diaphragm 9 reaches a predetermined thickness. During this process, the thickness of the diaphragm 9 can be changed by controlling the concentration of the impurity along the direction of the thickness of the silicon structure 5.

The substrate 6 and the silicon structure 5 which have been manufactured in this manner are bonded together in a vacuum by using an appropriate bonding method e.g. anodic bonding, thermal bonding, inorganic adhesive, thereby completing the pressure sensor.

Figure 6:
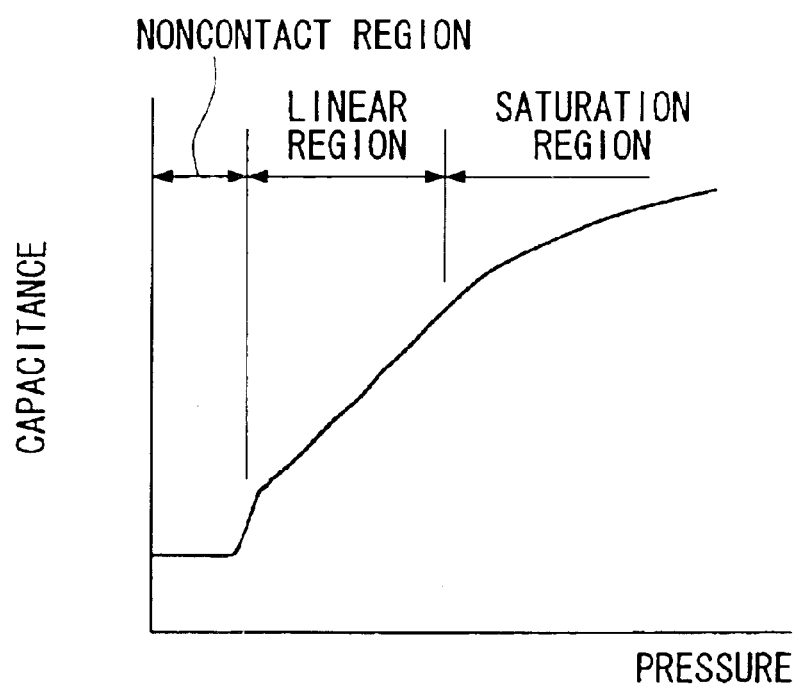
FIG. 6 is a graph showing the relationship between pressure and capacitance in a conventional pressure sensor.

In this pressure sensor, the terminal pads 11 are connected to a LCR meter for measuring capacitance, an ac voltage is applied between the diaphragm 9 and the electrode 7, and the pressure applied on the diaphragm 9 is detected by measuring the capacitance. As shown above in FIG. 6, when the pressure applied on the diaphragm 9 causes it to touch the dielectric film 8, the capacitance of the sensor increases substantially linearly with respect to the applied pressure within a certain range.

In this pressure sensor, since the concentration of the boron at the top face of the diaphragm 9 is equal to or greater than $1\times10^{19}$ cm$^{-3}$ and equal to or less than $9\times10^{19}$ cm$^{-3}$, and, particularly in a sensor for detecting high pressure (e.g. a pressure sensor for detecting the pressure of vehicle tires) less than $9\times10^{19}$ cm$^{-3}$, the pressure durability can be markedly high.

In this invention, the expression "less than $9\times10^{19}$ cm$^{-3}$" with regard to the impurity concentration signifies that particularly excellent results are obtained when the impurity concentration in a pressure sensor for high pressure (e.g. a pressure sensor for detecting the pressure of vehicle tires) is equal to or greater than $1\times10^{19}$ cm$^{-3}$ and less than $9\times10^{19}$ cm$^{-3}$, as explained in the examples described later. This does not imply that $9\times10^{19}$ cm$^{-3}$ is outside of the acceptable range.

EXAMPLE 1

The advantages of the invention will be explained specifically based on examples.

A touch mode capacitive pressure sensor having a silicon structure 5 comprising a diaphragm 9 bonded on a substrate 6, which a electrode 7 and a dielectric film 8 are provided on, such as that shown in FIGS. 1A and 1B, was manufactured.

During manufacturing, the electrode 7 comprising a Chromium thin-film and the dielectric film 8 comprising glass which covers the electrode 7 were provided on the substrate 6 comprising a glass plate; the electrode 7 and the dielectric film 8 have thickness of 0.1 μm and 0.4 μm respectively. The electrode 7 and the dielectric film 8 were formed in a series of processes, comprising film deposition using sputtering and patterning using lithography.

The diaphragm 9 is the opposite electrode of the lower electrode 7, and is made to function as an upper electrode by doping it with boron at high concentration. The shape of the diaphragm 9 in the top view was made a rectangle having dimensions of 0.4 mm×1.5 mm. The reason for the above shape is that, as disclosed in U.S. Pat. No. 5,528,452, when the shape of the diaphragm 9 is a rectangle wherein the ratio of the long side to the short side is not less than 3:1, the static capacitance changes linearly with respect to change in pressure within a certain range.

The distance of the gap 10 between the dielectric film 8 and the diaphragm 9 was 3 μm, and Aluminum terminal pads 11 for contacts with the external leads are provided in one pad on the substrate 6 in such a manner that one connects to the upper electrode and the other connects to the lower electrode. The series of manufacturing processes proceed using a silicon wafer and a glass wafer, and individual sensors are obtained by dicing the wafers after bonding them together.

FIG. 2 shows the detailed structure of the diaphragm of the manufactured touch mode capacitive pressure sensor. When making the diaphragm 12, thermal diffusion is used to dope boron into a silicon substrate 13 from the opposite face (the bottom face of the diaphragm) against a glass substrate 14. In this example, the temperature during the diffusion process was 1125 degrees C. and the diffusion time was set so that the boron concentration at the position (depth) of 7 μm from the bottom face of the diaphragm was $1\times10^{19}$ cm$^{-3}$ (specifically ten hours diffusion time). The diffusion depth of the boron in this case was approximately uniform at 9.4 μm depth from the bottom face of the silicon wafer. The boron concentration shows a constant value of approximately $2\times10^{20}$ cm$^{-3}$ from the bottom face of the diaphragm to a depth of 5.5 μm, and thereafter gradually began to decrease, becoming $2\times10^{14}$ cm$^{-3}$ at a depth of 9.4 μm. The diaphragm 12 was formed by anisotropic etching from the face (the top face of the diaphragm) that is the reverse face of the opposite face against the glass substrate 14. A KOH solution of 24 wt % at 80 degrees C. was used as the etching solution, and the etching time was controlled by using the etching stop technique so that the diaphragm 12 reached a thickness of approximately 6 µm.

The touch mode capacitive pressure sensor having the structure as described above was given a pressure durability test, in which breakages of the diaphragm were investigated after a constant pressure had been applied for a long period of time. In this test, pressure was applied to one thousand samples for a period of one hour, the pressure being increased in steps of 5 kgf/cm$^2$ from 20 kgf/cm$^2$ to 50 kgf/cm$^2$, and it was investigated whether there were any breakages in the diaphragm after this pressure soaking.

The results revealed that no breakages occurred in the diaphragm at an applied pressure of up to 35 kgf/cm$^2$, but the diaphragms in approximately 56 % of the tested sensors broke when the applied pressure reached 40 kgf/cm$^2$. When the applied pressure was subsequently increased to 50 kgf/cm$^2$, approximately 68% of the sensors broke. Most of the breakages in the diaphragms occurred along the long side and short side where most of the stress is concentrated when the rectangular diaphragm bends and touches the dielectric film.

FIG. 3 shows the distribution of the results obtained when one hundred sensors with broken diaphragms and one hundred sensors with non-broken diaphragms were extracted from the sensors used in the above pressure durability test, and the boron concentration at the top face of the diaphragms was investigated. FIG. 3 suggests that there were no breakages in sensors of which the boron concentration in the diaphragm top face is less than $9 \times 10^{19}$ cm$^{-3}$, whereas all the sensors with broken diaphragms had boron concentration of $9 \times 10^{19}$ cm$^{-3}$ or more. Since there was no substantial difference in the thickness of the diaphragms in any of the sensors, it can be confirmed that the breakages are not related to difference in diaphragm thickness.

Based on the results shown in FIG. 3, the touch mode capacitive pressure sensor was manufactured again, adjusting the etching time so that the boron concentration at the top face of the diaphragm was less than $9 \times 10^{19}$ cm$^{-3}$. In consideration of the fact that an adequate etch stop technique cannot be obtained when the boron concentration at the top face of the diaphragm is less than $1 \times 10^{19}$ cm$^{-3}$, the boron concentration was set at equal to or greater than $1 \times 10^{19}$ cm$^{-3}$ and less than $9 \times 10^{19}$ cm$^{-3}$. The pressure durability of five-hundred such sensors was evaluated by the same test as that mentioned above. The result was that no breakages occurred in any of the sensors after a pressure of 50 kgf/cm$^2$ was applied.

Embodiment 2

This pressure sensor, is similar to that described in the first embodiment, such as that shown in FIGS. 1A and 1B, has a silicon structure 5 comprising a diaphragm 9, which is conductive and can deform its shape in accordance with pressure, the silicon structure 5 being provided on a substrate 6, in which a electrode 7 of metal thin-film and a dielectric film 8 which covers the electrode 7 are provided on, so that the diaphragm 9 faces the electrode 7 and there is a gap 10 between the diaphragm 9 and the dielectric film 8.

In this embodiment, the density of etch pits 15 on the top face of the diaphragm 9 is five pits per µm$^2$ or less, preferably three per µm$^2$ or less, and most preferably one per µm$^2$ or less. The etch pits 15 are visible minute pits (holes) on the top face of the diaphragm 9 after etching. When the density of the etch pits 15 on the top face of the diaphragm 9 is equal to or greater than five pits per µm$^2$, it becomes impossible to adequately improve the pressure durability of the diaphragm. The etch pits 15 are symbolically shown in FIG. 1A by dots.

In the touch mode capacitive pressure sensor having a diaphragm of silicon doped with an impurity such as boron, pressure durability can be markedly improved by keeping the etch pit density on the top face of the diaphragm below five per µm$^2$, and below one per µm$^2$ in the case of a sensor for particularly high pressure is applied(e.g. a sensor for detecting the pressure of vehicle tires).

The etch pits appear in a layer doped with boron as a result of etching in regions where the boron concentration exceeds $9 \times 10^{19}$ cm$^{-3}$, and the etch pit density increases in correspondence with increase in the etching time. Therefore, the impurity (boron) concentration at the top face of the diaphragm should be equal to or less than $9 \times 10^{19}$ cm$^{-3}$, and preferably equal to or greater than $1 \times 10^{19}$ cm$^{-3}$ and less than $9 \times 10^{19}$ cm$^{-3}$. The etch pit density on the top face of the diaphragm can be determined by observation using atomic force microscopy.

There are several methods for measuring the concentration of the impurity (boron) at the top face of the diaphragm, for example, spread resistance (SR). In this method, the resistance from the top face of the boron diffusion layer in the direction leading toward the depth is measured, and the concentration of the carrier is determined from that resistance value. The concentration can be calculated from the resistance by logical computation, and the logic for this purpose has been established.

Subsequently, a manufacturing method of the pressure sensor having the structure described above will be explained as one example of the pressure sensor manufacturing method of the present invention.

The substrate 6 is manufactured in the same manner as in the first embodiment. The electrode 7 and the terminal pads 11 connected thereto are provided on the substrate 6 by using sputtering and the like as already mentioned above; then, the glass dielectric film 8 is formed by sputtering and the like, covering the electrode 7 while leaving the terminal pads 11 exposed, and one of terminal pads 11 on the silicon structure 5 side is provided by using the same method as the electrode 7.

The silicon structure 5 is manufactured by high concentration doping of an impurity, such as boron, from the face of the silicon wafer which bonds the substrate 6 by using a method such as thermal diffusion, and then providing the diaphragm 9 by etching from the reverse side to the bonded face so that the etch pit density at the top face (etching face) is equal to or less than five pits per µm$^2$, preferably equal to or less than three pits per µcm$^2$, and most preferably equal to or less than one pit per µm$^2$.

The etching process is performed by using at least one solution selected from a group comprising KOH, NaOH, ethylene diamine pyrocatechol (EDP), and tetramethyl ammonium hydroxide (TMAH), and by utilizing the etch stop technique of leaving the section which has been doped with a high concentration impurity; and the etching time is controlled so that the diaphragm 9 reaches a predetermined thickness. During this process, the thickness of the diaphragm 9 can be changed by controlling the concentration of the impurity along the direction of the thickness of the silicon structure 5.

To make a diaphragm having an etch pit density of equal to or less than one per µm$^2$, it is preferable to perform uniform etching using a KOH solution having a concentration of equal to or greater than 1 wt % and less than 10 wt %. Furthermore, the impurity concentration of a diaphragm having such an etch pit density should preferably be equal to or greater than $1 \times 10^{19}$ cm$^{-3}$ and less than $9 \times 10^{19}$ cm$^{-3}$.

Then, the substrate 6 and silicon structure 5 which have been manufactured in this manner are bonded together in a vacuum by using an appropriate method, e.g. anodic bonding, thermal bonding or an inorganic adhesive, thereby completing the pressure sensor. The detecting sequence of this pressure sensor is the same as that in the first embodiment.

EXAMPLE 2

The effects of the present invention will be explained specifically based on an example.

A touch mode capacitive pressure sensor having the structure such as that shown in FIGS. 1A, 1B, and 2 was manufactured by the same sequence as in the first example, and was given a pressure durability test, in which breakage in the diaphragm were investigated after a constant pressure had been applied for a long period of time.

The test was carried out using wafers in their state prior to being cut into elements, and there were ten samples (ten wafers) A to J. Five-hundred sensor elements were arranged on each wafer.

Figure 4:
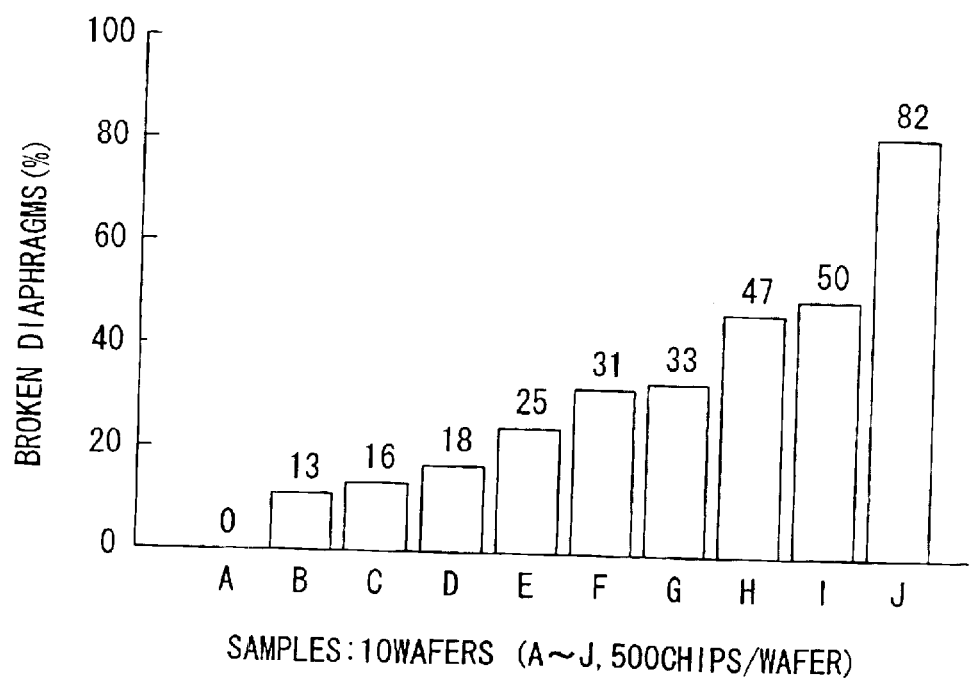
FIG. 4 is graph showing the distribution of the breakage in different 10 (A to J) wafers, which are manufactured using the conventional technique.
Figure 5A:
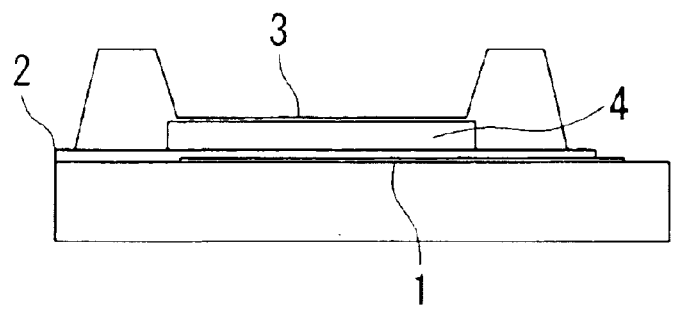
FIG. 5A is a side view of a conventional pressure sensor, and shows the state when pressure is not applied.
Figure 5B:
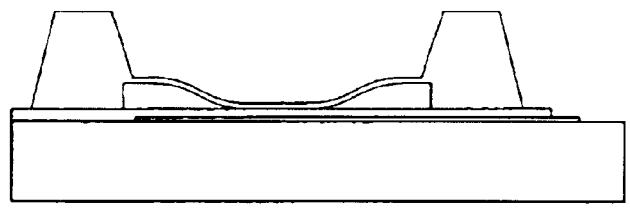
FIG. 5B is a side view of a conventional pressure sensor, and shows the state when pressure has caused the diaphragm to touch the side of the dielectric film.

After applying a pressure of 40 kgf/cm$^2$ for a period of one hour, it was investigated whether there were any breakage in the diaphragms. FIG. 4 shows the distribution of the breakage of the wafers A to J which are sorted in the failed rate order. There was wide variation in the frequency from the wafers in which no diaphragms were broken to those in which 82% of the diaphragms were broken. Most of the breakages in the diaphragms occurred along the edge of the diaphragm where most of the stress is concentrated when the rectangular diaphragms bend and touch the dielectric film.

Ten sensors on wafers with particularly excellent pressure durability, and ten sensors on wafers with noticeably poor pressure durability were chosen from the wafers were used in the test, and the morphology of the diaphragms were observed by using atomic force microscopy. It was confirmed that six to eight pits having a diameter of approximately 0.2 µm were distributed at high density in an area of 1 m$^2$ on the top face of the diaphragms with noticeably poor pressure durability. On the other hand, this kind of high density pit distribution was not discovered on the top faces of diaphragms in sensors with very high pressure durability; and the surface of these diaphragms were extremely smooth.

The pits which were distributed at high density are thought to be produced during the etching process to form the diaphragm. Irrespective of whether or not the diaphragm breakage, there was no significant difference in the thickness of the diaphragms in any of the sensors, confirming that differences in pressure durability are not related to dispersion in diaphragm thickness.

Moreover, when the boron concentration at the top face of the diaphragms was investigated, the boron concentration of the top faces of all the sensors which have high pressure durability was less than $9 \times 10^{19}$ cm$^{-3}$, whereas the boron concentration at the top faces of all the sensors with poor pressure durability was equal to or greater than $9 \times 10^{19}$ cm$^{-3}$.

These results suggest that the pressure durability of the sensors are related to the etch pits on the diaphragm and the impurity concentration where the etch pits generate is greater than $9 \times 10^{19}$ cm$^{-3}$.

Because there is the depth profile of the boron concentration in the diaphragm, it is important that the control of etching time to stop the etching face at a proper impurity concentration in the profile.

Therefore, since it is thought that the difference in the boron concentration at the top face of the diaphragm is due to difference in the etching time when making the diaphragms, change in the morphology of the top face of the diaphragm with respect to the etching time was investigated, and as a result, it was found that the etch pits on the diaphragm are generated as the etching time increases. This result suggests that an exclusively longer etching time produces more etch pits and makes the sensor poor in the pressure durability. Emphasis was placed on these points in subsequent consideration.

A gap between the etching rate of P$^+$ layer and that of substrate depends on concentration of KOH solution. A lower concentration (<10 wt %) makes the gap wider as disclosed for example in a paper by H. Seidel and others (J. Electrochem. Soc. Vol. 137, No. 11, 3629-3632, 1990). Accordingly, the present inventors attempted to improve the pressure durability by expanding the gap of the etching rate, by using 8 wt % KOH solution in order to surpress etch pits. The temperature of the solution was set at 80 degrees C., which is the conventional temperature, and etching was performed while stirring the solution to achieve a good uniformity in thickness of the diaphragm in a wafer. The pressure durability of five-hundred sensors was evaluated by the same method as the earlier test. It was confirmed that no breakages occurred in the diaphragms of any sensors after a pressure of 50 kgf/cm$^2$ had been applied thereto. When the morphology of the diaphragms of these sensors was investigated using atomic force microscopy, it was confirmed that the pits which were observed on wafers were reduced by one pit or less per 1 µm$^2$. Furthermore, when the solution had a concentration of less than 1 wt %, it was difficult to achieve a superior uniformity in thickness deviation of the diaphragm.

From the above results is can be understood that the density of etch pits can be reduced to less than one pit per µm$^2$ and the pressure durability of the diaphragm can be improved by using a KOH solution having concentration of equal to or greater than 1 wt % and less than 10 wt %, which achieve a superior uniformity in thickness of the diaphragm in a wafer or lot to lot. One method to achieve superior uniformity of a diaphragm in a capacitive pressure sensor comprises using two types of solutions having different concentrations, as disclosed in Japanese Unexamined Patent Application, First Publication No. 11-326095.

According to our study, the etch pit, of which density is equal to or greater than five per µm$^2$, make the pressure durability of the sensor poor. Therefore, the etch pit density of the sensor which is used in particularly high pressure applications (e.g. a sensor for detecting the pressure of vehicle tires), should be equal to or less than one per µm$^2$.

As a result of optimization in etching process, that is control of etching time and etching solution, the sensor with no etch pits on the diaphragm can be obtained.

As described above, according to this invention, in a touch mode capacitive pressure sensor having a diaphragm made from boron-doped silicon, the boron concentration at the top face of the diaphragm is made equal to or greater than $1 \times 10^{19}$ cm$^{-3}$ and less than $9 \times 10^{19}$ cm$^{-3}$, thereby greatly improving the pressure durability of the diaphragm.

Further, according to the present invention, in a touch mode capacitive pressure sensor having a diaphragm made by doping of an impurity and anisotropic etching, the etch pit density on the top face of the diaphragm is equal to or less than five pits per µm$^2$, and more preferably equal to or less than one pit per µm$^2$, thereby greatly increasing the pressure durability of the diaphragm. Therefore, according to the present invention, it is possible to provide a touch mode capacitive pressure sensor comprising a diaphragm having more superior pressure durability than conventional sensors.

Furthermore, as described above, since the pressure sensor of the present invention has superior pressure durability in the diaphragm, the diaphragm does not break even when the applied pressure greatly exceeds the actual operating pressure range. As a result, the pressure sensor is particularly suitable for detecting the pressure of vehicle tires, which requires stability.

What is claimed is:

1. A pressure sensor comprising a silicon structure having a conductive diaphragm, the silicon structure being bonded on a substrate, which comprises an electrode covered by a dielectric film, so that the diaphragm and the electrode are facing each other and there is a gap between the diaphragm and the dielectric film, the pressure sensor measuring a pressure applied thereto by detecting capacitance according to the area of a contact face of the diaphragm which touches the dielectric film when the pressure is applied;

the concentration of an impurity at the top face of the diaphragm being equal to or greater than $1\times10^{19}$ cm$^{-3}$ and less than $9\times10^{19}$ cm$^{-3}$.

2. A pressure sensor comprising a silicon structure having a conductive diaphragm, provided by doping of an impurity and anisotropic etching, the silicon structure being bonded on a substrate, which comprises an electrode covered by a dielectric film, so that the diaphragm and the electrode are facing each other and there is a gap between the diaphragm and the dielectric film, the pressure sensor measuring a pressure applied thereto by detecting capacitance according to the area of a contact face of the diaphragm which touches the dielectric film when the pressure is applied;

the etch pit density on the top face of the diaphragm being equal to or less than five per $\mu m^2$.

3. The pressure sensor of claim 1, wherein the impurity is boron.

4. The pressure sensor of claim 2, wherein in etch pit density on the top face of the diaphragm is equal to or less than three pits per $\mu m^2$.

5. The pressure sensor of claim 2, wherein in etch pit density on the top face of the diaphragm is equal to or less than one pit per $\mu m^2$.

6. The pressure sensor of claim 2, wherein the impurity is boron.

* * * * *